(12) United States Patent
Parvin et al.

(10) Patent No.: US 7,566,881 B2
(45) Date of Patent: Jul. 28, 2009

(54) DIAL-PHOSWICH HYBRID SYSTEM FOR REMOTE SENSING OF RADIOACTIVE PLUMES IN ORDER TO EVALUATE EXTERNAL DOSE RATE

(76) Inventors: Parviz Parvin, Physics Dept. Amir Kabir University of Technology, Tehran, Tehran (IR); Gholamreza Shayeganrad, Amir-Kabir University, Physics Dept. Hafez Ave, Tehran, Tehran (IR)

( * ) Notice: Subject to any disclaimer, the term of this patent is extended or adjusted under 35 U.S.C. 154(b) by 0 days.

(21) Appl. No.: 11/782,647

(22) Filed: Jul. 25, 2007

(65) Prior Publication Data
US 2008/0149838 A1    Jun. 26, 2008

(51) Int. Cl.
*G01T 1/00*    (2006.01)
*G01N 21/39*    (2006.01)
(52) U.S. Cl. ...................................... 250/394
(58) Field of Classification Search ................. 250/394
See application file for complete search history.

(56) References Cited

U.S. PATENT DOCUMENTS

2004/0145089 A1*    7/2004    Burrows ...................... 264/496

FOREIGN PATENT DOCUMENTS

WO    WO 2006/083802 A2 *    8/2006

OTHER PUBLICATIONS

Parvin, P., et al., "Remote Element Tracing of Trans-Uranium Plumes using an Interactive UV Laser DIAL Coupled with a Phoswich Detector," European Quantum Electronics Conference 2005, Jun. 12-17, 2005, p. 203.*
Parviz Parvin, [CV online], [retrieved on Aug. 5, 2008]. Retrieved from the Internet: <URL: http://www.aut.ac.ir/NEP/DR%20PARVIN/Parviz%20Parvin.htm>.*
Parvin's Paper, [list of papers online], [retrieved on Aug. 5, 2008]. Retrieved from the Internet: <URL: http://www.aut.ac.ir/NEP/DR%20PARVIN/parvin's_paper.htm>.*
Final program, 23rd ILRC [International Laser Radar Conference], Nara, Japan, Jul. 24-28, 2006. Retrieved from the Internet: <URL: www-lidar.nies.go.jp/ilrcnara.jp/ILRCProgramFinal.pdf>.*
Parviz Parvin, [CV online], [retrieved on Aug. 5, 2008], Retrieved from the Internet: <URL: http://www.aut.ac.ir/NEP/DR%20PARVIN/Parviz%20Parvin.htm>.*

* cited by examiner

*Primary Examiner*—Constantine Hannaher
(74) *Attorney, Agent, or Firm*—Ide Sazane Aryan; Barry Choobin

(57) ABSTRACT

An interactive combination of Phoswich detector array (PDA) and differential absorption lidar (DIAL) is proposed to trace the unknown radioactive plumes released into the atmosphere from a reactor stack, containment of the nuclear power plants, radioisotope separation laboratories, reprocessing plants or the uranium conversion facilities. The hybrid system represents a powerful technique for the prompt identification and quantification of the effluents with various radionuclide contents to determine the corresponding external dose rate accordingly.

4 Claims, 16 Drawing Sheets

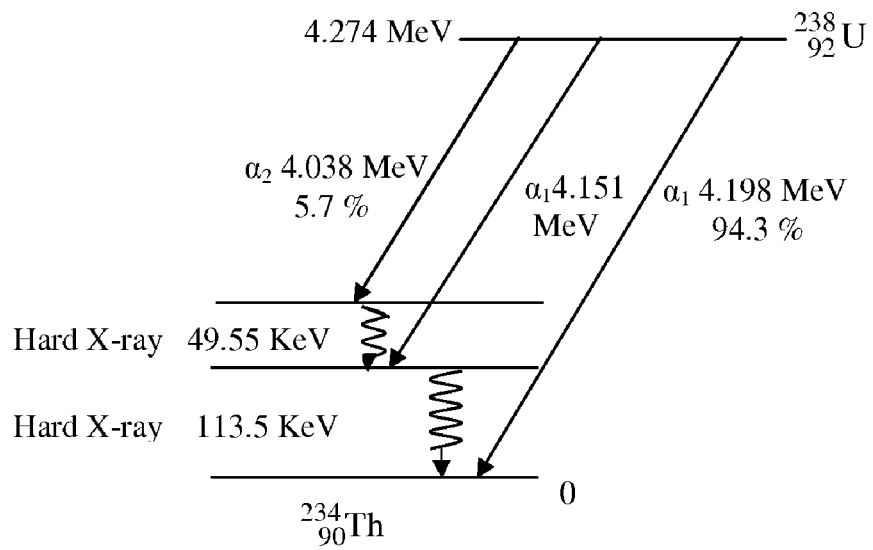
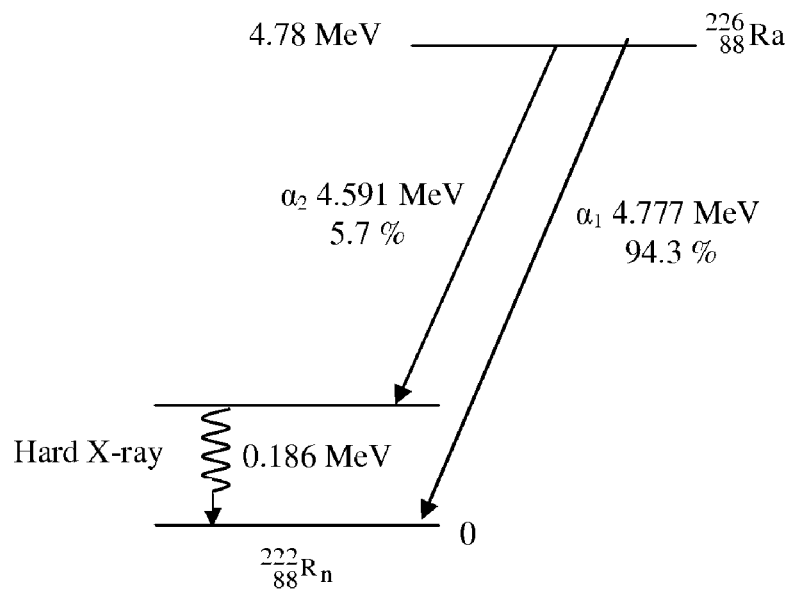
Fig.1. ~~Typical α-decay schemes of $^{238}_{92}$U and $^{228}_{88}$Ra.~~
(Prior art)

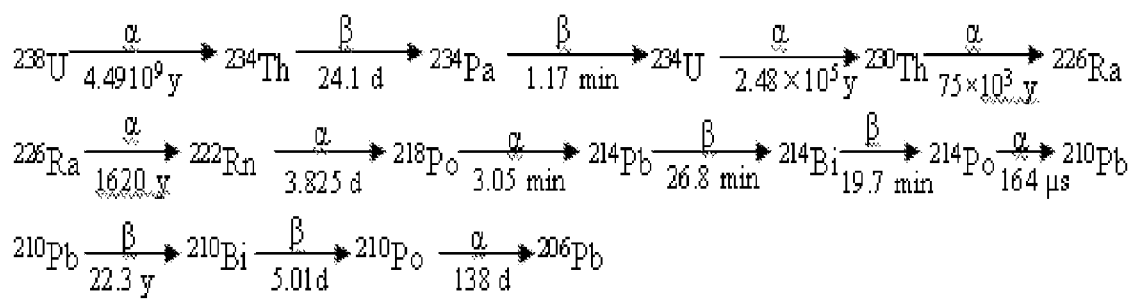
Fig. 2. ~~Decay chain of uranium.~~
(Prior art)

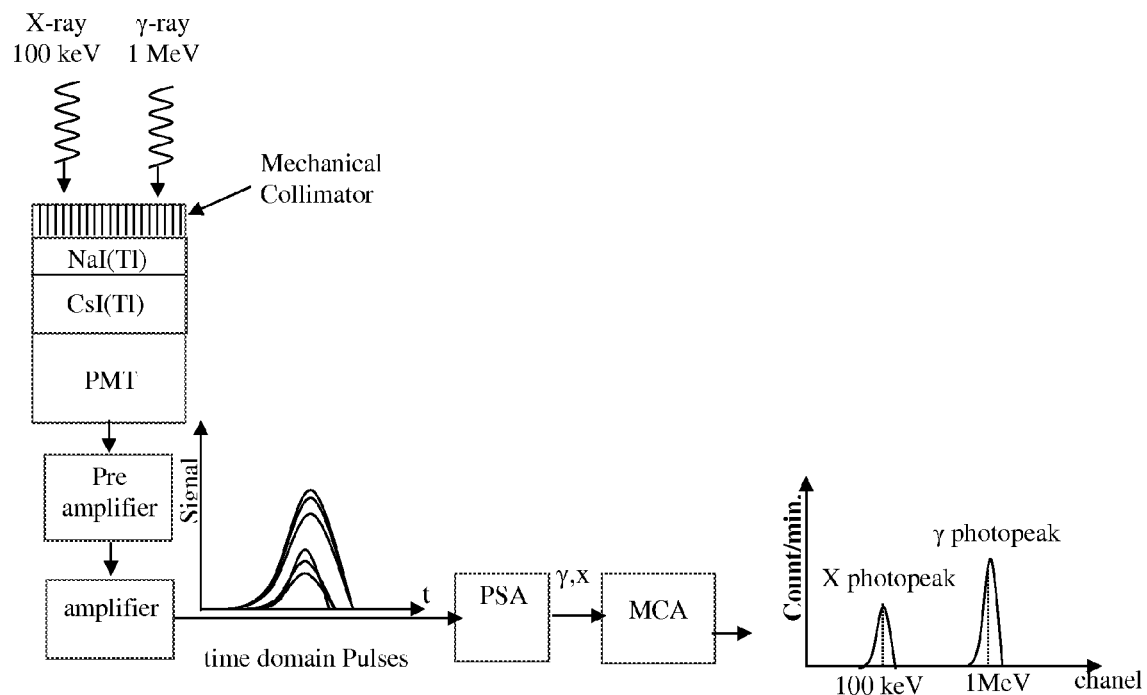
Fig. 3. Performance of Phoswich dual energy analyzer in order to identify X/γ photon energies.

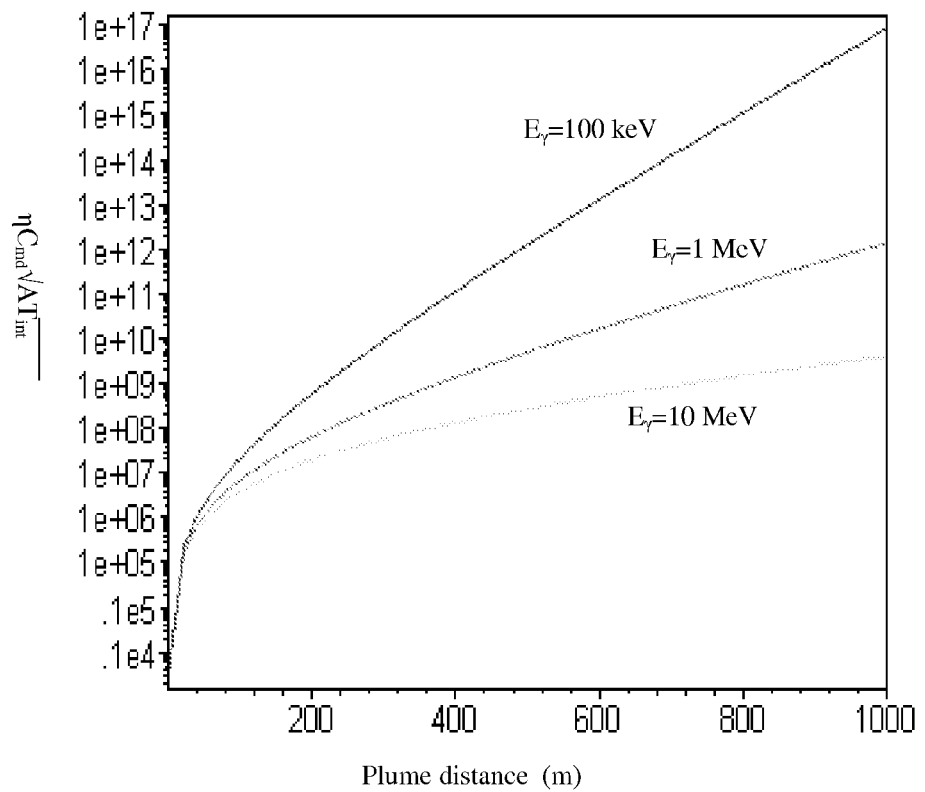
Fig.4. ~~The Phoswich characteristic parameter~~ $\eta C_{dm}\sqrt{AT_{int}}$ ~~versus plume distace for various X/γ photon energies.~~

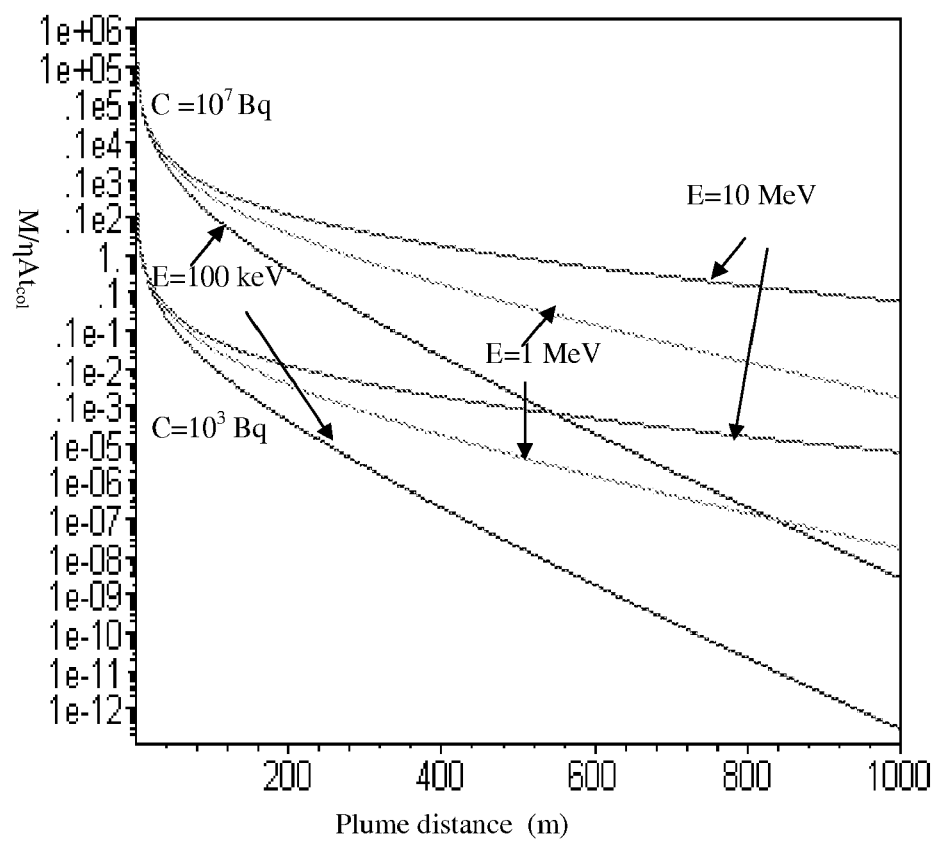
Fig. 5. Phoswich normalized counts, M/ηAT int, versus plume distance for various plume activities and different gamma energies.

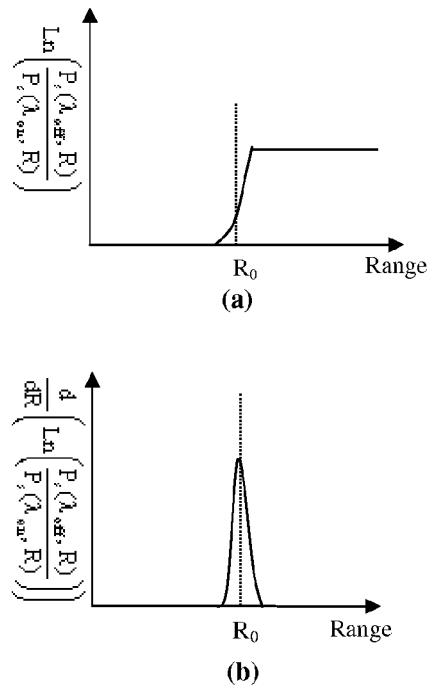
Fig. 6. The graphical representation of $Ln\frac{P_s(\lambda_{off},R)}{P_s(\lambda_{on},R)}$ and $\frac{d}{dR}\left(Ln\frac{P_s(\lambda_{off},R)}{P_s(\lambda_{on},R)}\right)$ versus range. R0 is the plume location.

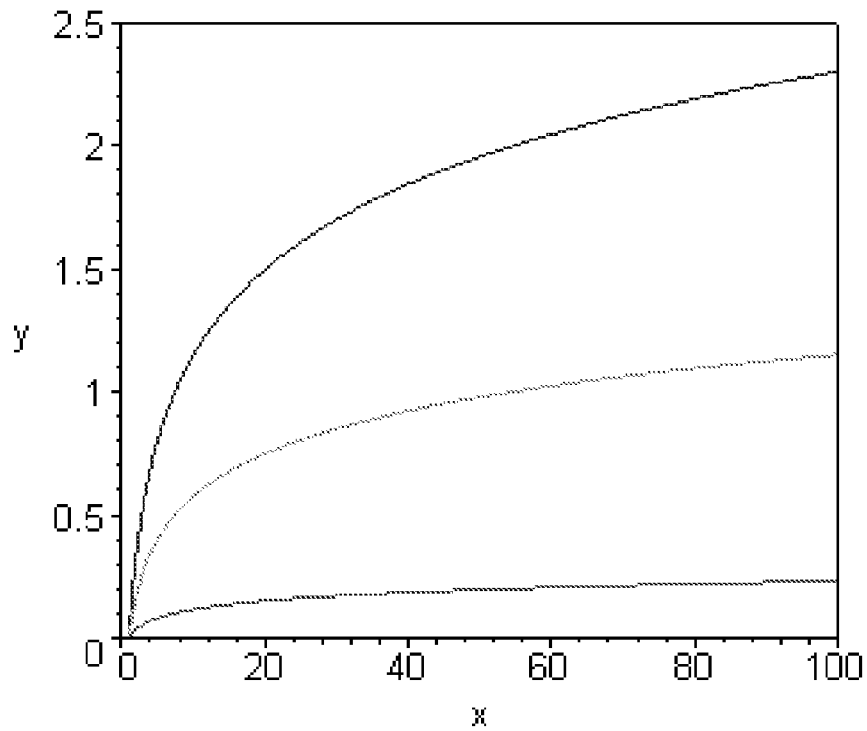
Fig.8. ~~DIAL maximum range detection versus PMT characteristic parameter,~~ ~~$P_{s,min}(\lambda_{off}, R) \frac{D^*}{\sqrt{A\Delta f}} \cdot \frac{1}{SNR}$~~ ~~, for various differential absorption coefficients $\Sigma = N[\sigma abs(\lambda on) - \sigma abs(\lambda off)]$.~~

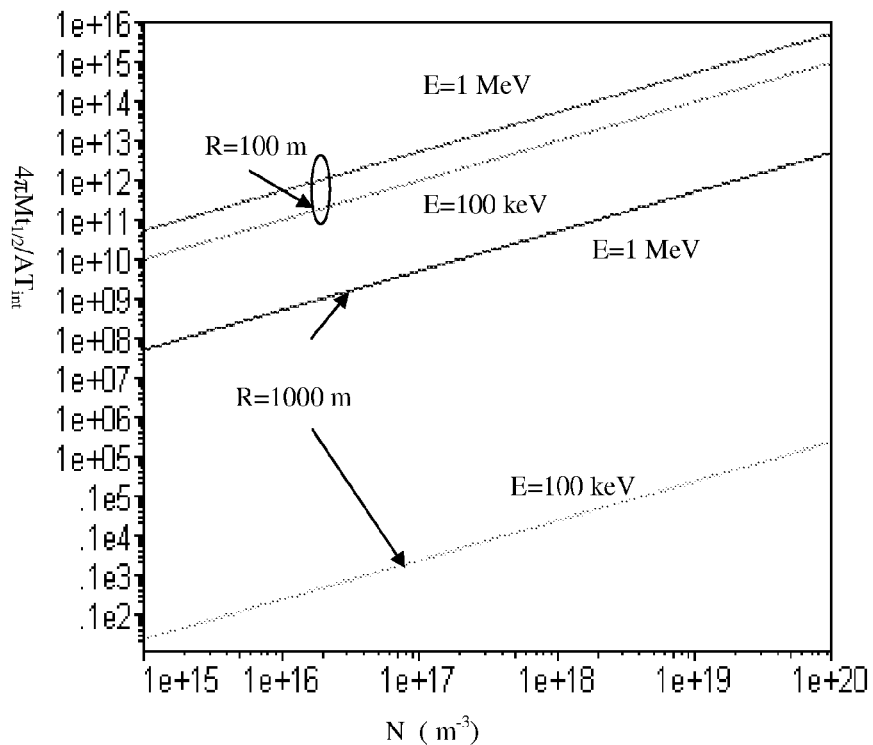
Fig. 9. The Phoswich characteristic parameter in hybrid system, 4πMt1/2/ATint, versus plume concentration at various x/γ energies for different plume locations R.

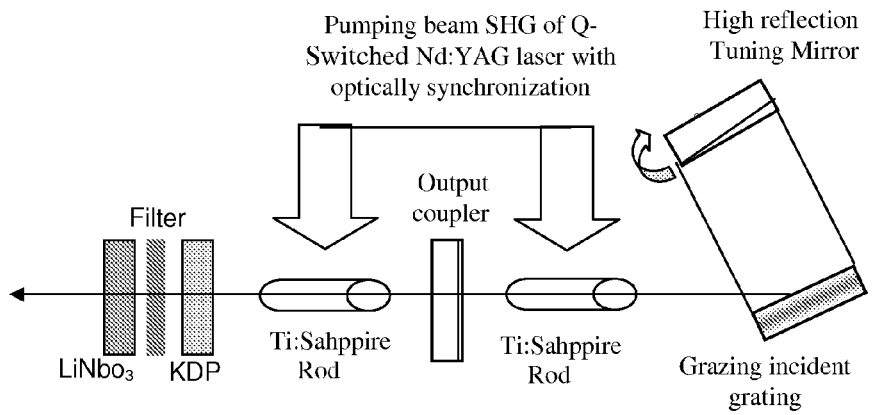
Fig.10 (a) ~~The schematic tunable UV oscillator-amplifier of Littman type Ti:Al2O3 laser.~~
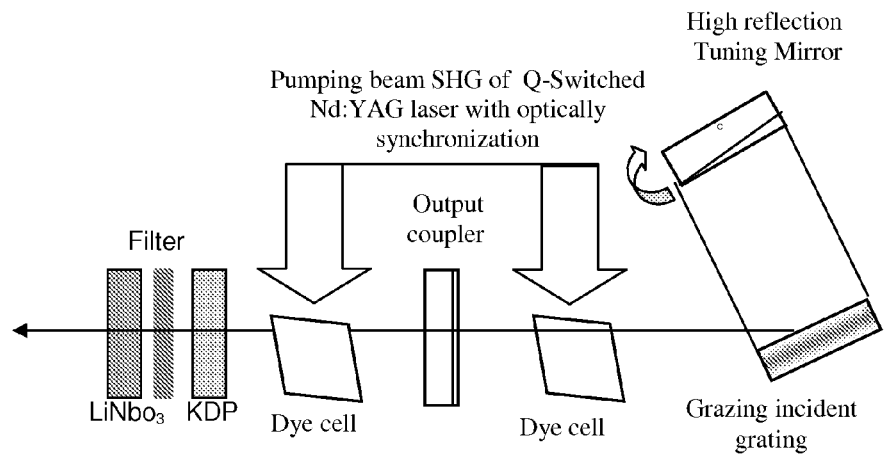
Fig.10 (b) ~~The schematic tunable UV oscillator-amplifier of Littman type dye laser. Gland Prism (GP) and Rochon Prism (RP) are used to separate IR/Vis and UV/Vis spectra based on linear polarization, respectively.~~

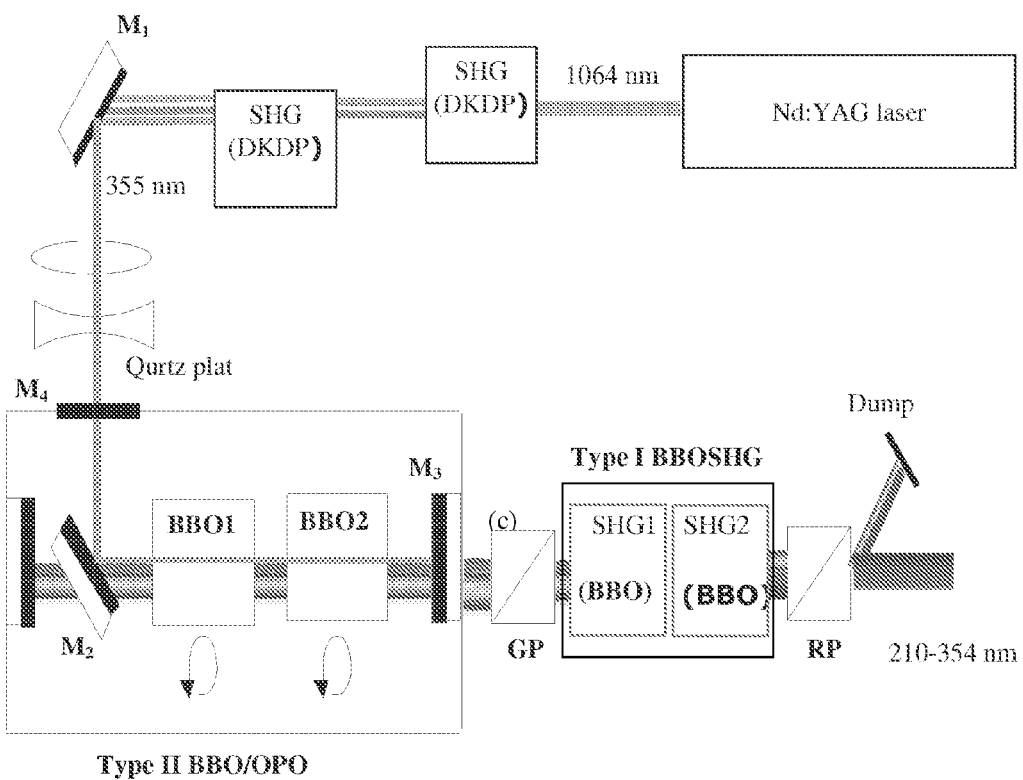
Fig. 10 (c) ~~The schematic tunable UV oscillator-amplifier of a simplified tunable UV BBO-OPO. Gland Prism (GP) and Rochon Prism (RP) are used to separate IR/Vis and UV/Vis spectra based on linear polarization, respectively.~~

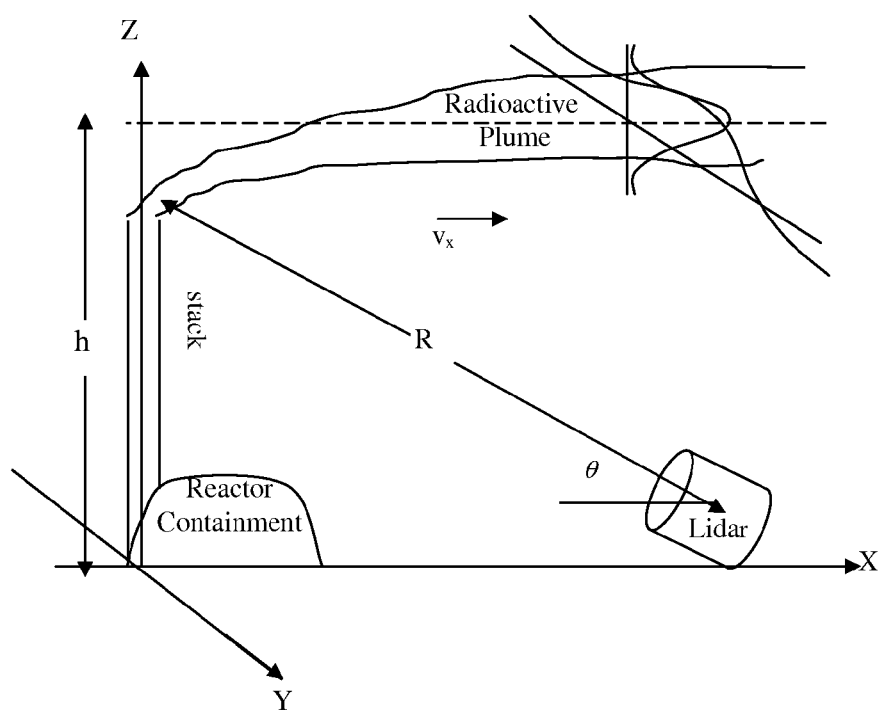
Fig. 11. Simplified geometry of released radioactive materials above the stack of a nuclear power reactor monitoring by DIAL detection.

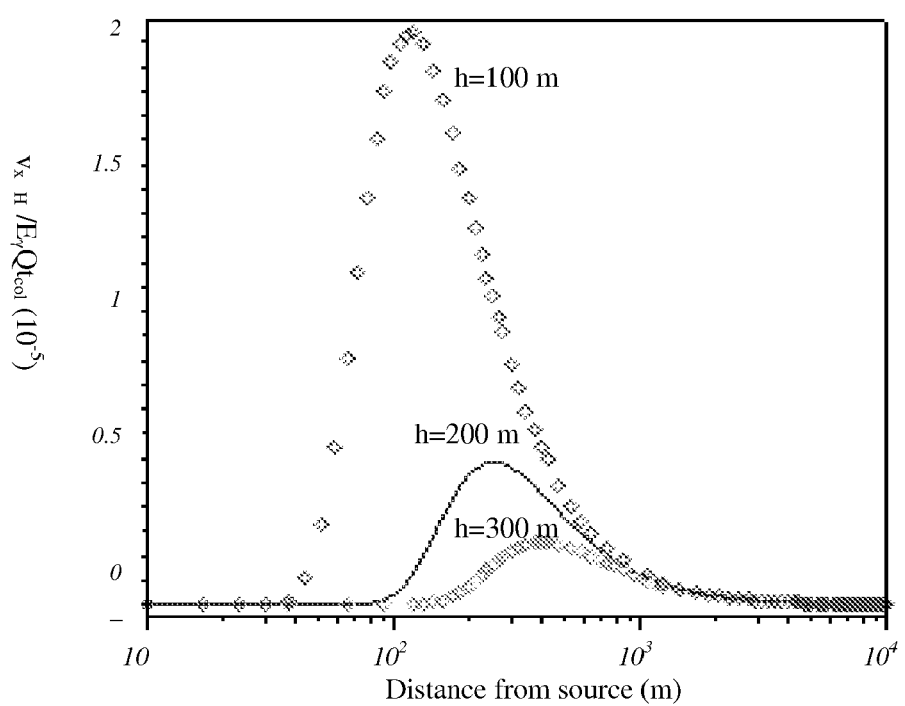
Fig. 12. ~~The external dose rate equivalent parameter, $v_x \dot{H}/E_\gamma Q$, versus distance from reactor stack.~~

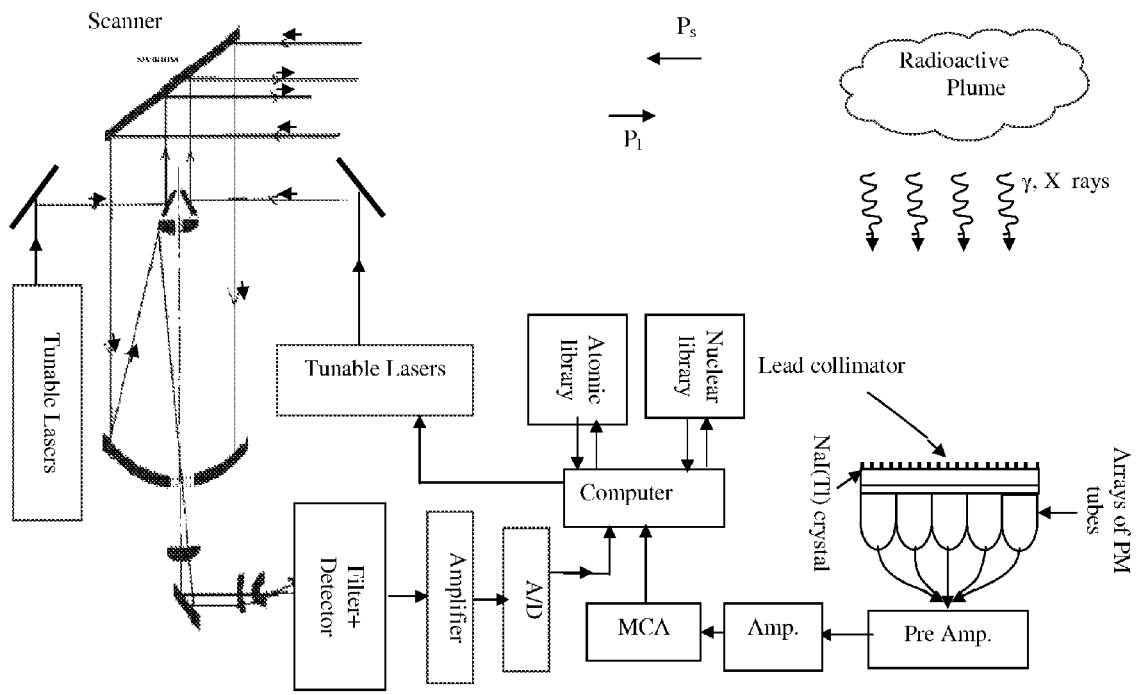
Fig.13. ~~The performance of Phoswich DIAL hybrid system.~~

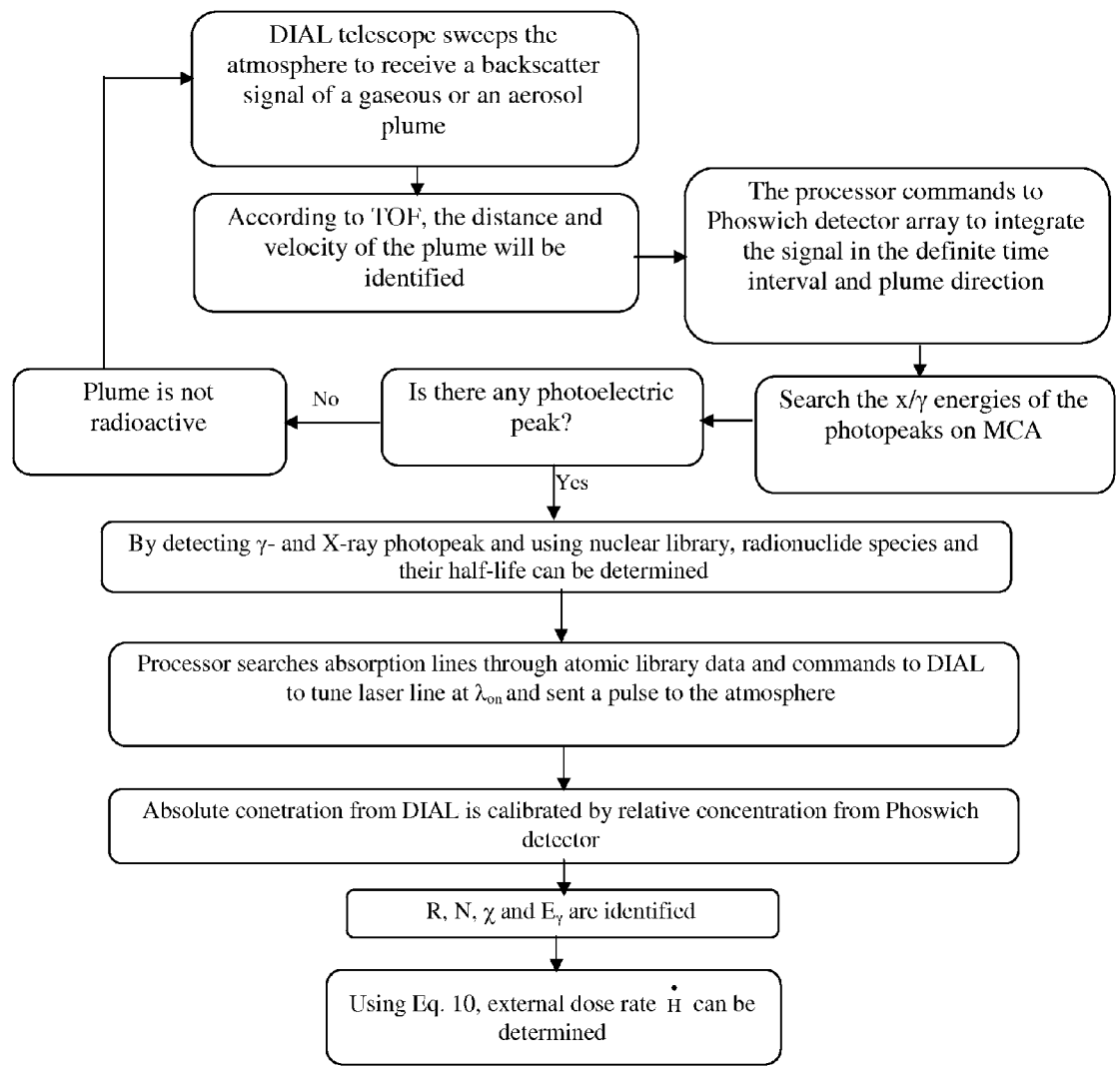
Fig. 14. ~~Block diagram of hybrid system performance.~~

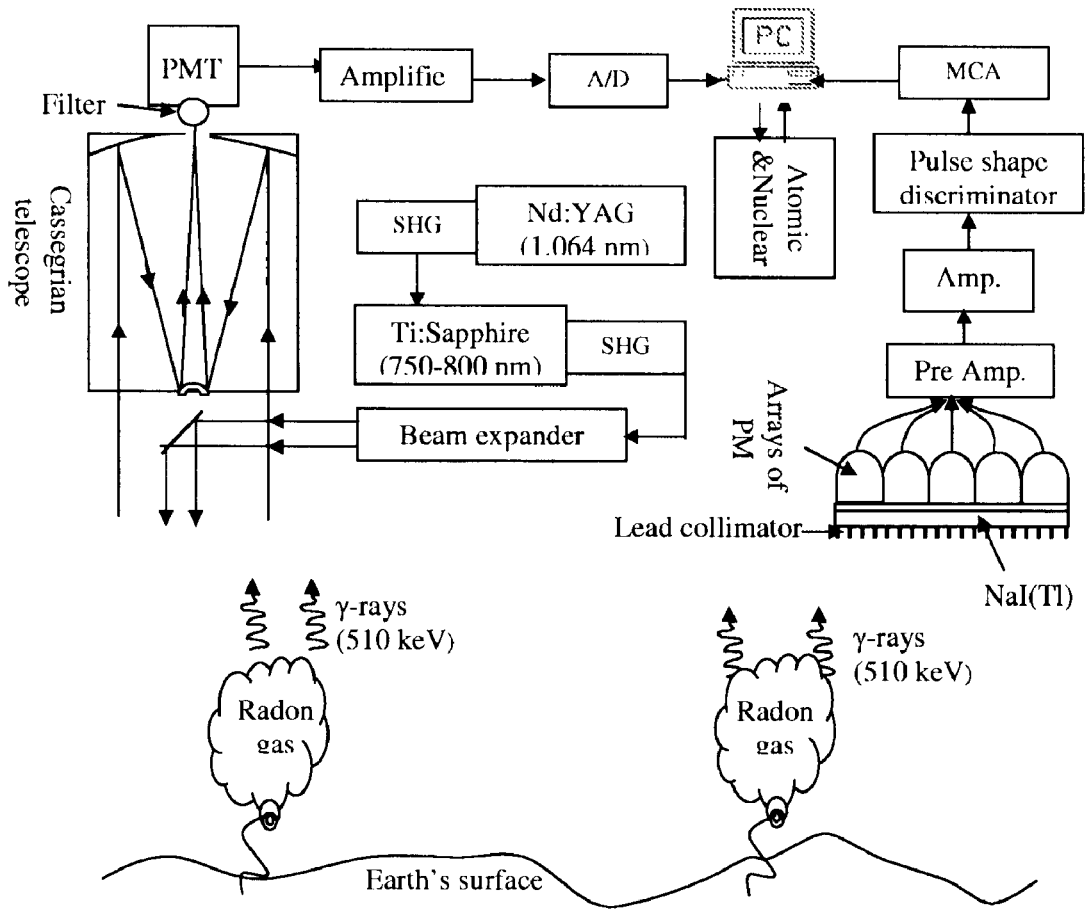
Fig. 15 Schematic diagram of hybrid system for radon monitoring.

DIAL-PHOSWICH HYBRID SYSTEM FOR REMOTE SENSING OF RADIOACTIVE PLUMES IN ORDER TO EVALUATE EXTERNAL DOSE RATE

SPONSERSHIP

The present invention is sponsored by Iranian National Science Foundation.

BACKGROUND OF THE INVENTION

Radioactive pollutants which are released from the nuclear wastes, nuclear explosion or the nuclear sites during the accidents are known to be extremely hazardous for human health, therefore, they must be quickly identified and well protected.

Environmental concerns about nuclear power plants are prompted mainly by the effects of the radiations on the population living in the neighborhood. Nuclear risk in any geographical area is connected with nuclear sites in many areas. The Chernobyl core meltdown accident showed that the scale of impact can be very large and the risk of remote nuclear sites should also be of considerable concern for the area. Thus, it is important to obtain the geographic distribution of the nuclear risk based on the external dose.

The radioactive decay often leaves the product nuclide in an excited state which either falls directly to the ground state or in steps to lower energy states through the emission of energy as gamma or characteristic X-ray radiation. FIG. 1 shows the typical decay schemes of $^{226}$Ra and $^{238}$U. The excited nucleus $^{222}$Ra usually falls to the ground state by emitting a hard X-ray of about 186 keV. Similarly, the excited $^{234}$Th decays with accompanying the emission of two subsequent X-ray photons of 49.5 keV and 113.5 keV.

In addition, there is always a small amount of background radiation in the atmosphere present from cosmic and natural sources. A major natural source of radionuclides is radon, a noble gas product of radium decay. Radon may enter the atmosphere as either of two isotopes, $^{222}$Rn ($t_{1/2}$=3.8 d) and $^{220}$Rn ($t_{1/2}$=54.5 sec). Both emit alpha particles in decay chains that terminate with stable isotopes of lead as shown in FIG. 2. The initial decay products are nongaseous, $^{218}$Po and $^{216}$Po, and adhere readily to atmosphere particulate matter.

Furthermore, cosmic rays act on nuclei in the atmosphere to produce other radionuclides, including $^3$H, $^7$Be, $^{10}$Be, $^{14}$C, $^{22}$Na, $^{32}$P, $^{39}$Cl, and $^{33}$P. The cosmic radiation from the space, including the radiation from the sun, consists mainly the highly energetic protons, alpha particles and to some extent of heavier charge particles to give a dose of about 10 μSv/year on the ground level.

Before the practice was discontinued, the above-ground detonation of nuclear weapons added large amounts of radioactive particulate matter to the atmosphere as well. Because of food contamination and bio-uptake, the most serious fission contaminant products from this source were $^{90}$Sr, $^{131}$I, and $^{137}$Cs. The two later isotopes are absorbed by human organs to establish the major sources of internal dose.

The radioactivity from the ground is strongly varying, dependent on the living places. The average dose is usually ~0.5 mSv per person annually, however there are places where the dose can be several times higher. The radioactivity originates from long-lived isotopes with lifetime of order $10^9$ years, particularly for $^{232}$Th, $^{235}$U and $^{238}$U which, are of importance since they are decaying by means of a long decaying chain, resulting in a number of daughter isotopes. The most significant radionuclides based on radiation protection are $^{222}$Rn and $^{226}$Ra from the $^{236}$U radioactive family, as well as $^{220}$Rn and $^{224}$Ra of the $^{232}$Th radioactive chain. In generals, the average human being from those natural sources is receiving a dose equivalent of approximately 2 mSv/yr.

As a result, the radionuclide pollutants are known to be hazardous for human health, therefore they must be quickly identified and well protected, mainly by the continuous environmental monitoring equipments which includes surveillance and checking relevant to assessing the behavior and pathways of radionuclides for environmental safety particularly at nuclear facilities. Remote sensing of radioactive elements are desired to answer which source appears to be the most dangerous for people living close to the nuclear sites and which regions are at the highest risks from a hypothetical accidental release.

Alpha and beta particles have a low penetrating power in air, thus the remote sensing of those radionuclide are extremely difficult. Several passive sensing methods are available including in situ alpha and beta spectroscopy, Geiger and solid state nuclear track detectors. On the other hand, the highly penetrating gamma emissions denote to be a characteristic for the remote sensing of the species. A known technique for remote sensing of gamma emitter species within the plume released into the atmosphere is the remote gamma spectroscopy, using large scintillator crystals, based on photopeak energies detection and relative photopeak amplitudes. However, most of the transuranium and uranium chain elements and their daughters emit characteristic X-rays rather than γ photons, where Phoswich detector can be utilized. Phoswich array detector coupled with multichannel analyzer is a well known technique to provide a high detection efficiency owning sensitive and low noise characteristic regarding the conventional gamma spectrometers. It therefore offers the advantages of better precision and lower detection limits. It measures characteristic X or γ photopeaks of radioactive elements to identify types of constituents as well as their relative concentrations even in the presence of high level background radiation.

On the other hand, the optical spectroscopic methods are well known to provide remote sensing with the advantages such as high sensitivity, fast response and molecular or atomic selectivity. A number of the passive remote sensing techniques for detecting, identifying and quantifying signature of the plumes are the hyper spectral infrared spectroscopy and Echell grating spectrometer. Various techniques of laser spectroscopy have been successfully employed in atmospheric and environmental research are laser induced fluorescence, photoacoustic detection, spontaneous Raman scattering, coherent anti-stockes Raman spectroscopy, laser induced breakdown spectroscopy and differential absorption lidar (DIAL). In particular, the absorption spectroscopy using a suitable tunable laser can lead to an efficient remote sensor.

Among those instruments, UV/Vis DIAL offers unique advantages for radioactive element detection mainly because of strong atomic absorption cross-section at that spectral range. A number of UV/Vis laser remote sensing instruments are operated for meteorological and measuring atmospheric optical parameters of Ozone, water vapor, aerosols and clouds. These include UV high spectral resolution tunable lidar, fourth and third harmonic Ti:Al$_2$O$_3$, SHG/THG tunable dye laser in UV range as well as single frequency triplet Nd:YAG laser and various excimer lasers lines. Presently, remote sensing of toxic chemical and aerosol pollutants using various tunable UV lasers are being extensively investigated. UV-DIAL can be used to measure continuous concentration of atmospheric trace of SO$_2$ and O$_3$ conveniently due to the emission from smoke stacks or volcanoes. The DIAL technique is also used for the determination of the stratospheric ozone profile. An XeCl excimer laser is used to tune the strong ozone absorption line while a third harmonic Nd:YAG laser is employed as a reference wavelength.

There are few works available on the remote measurement of radioactive species. One approach that provides a unique signature is nuclear quadruple resonance. The other methods are based on secondary radioactive effects including anomalous gaseous fields and their emission in optical and microwave range and passive registration of the optical fluorescence emission of high ionized air induced by α-particle, γ- and X-ray radiations. Those methods are characterized by low signal to noise ratio because of a large amount of atmospheric natural and artificial sources radiation appears within the spectral range.

Here DIAL-Phoswich hybrid system is introduced, which is potentially an advantageous technique to investigate dynamic effluent parameters of a plume. It consists of both passive nuclear and active atomic detection units. It is based on Phoswich detector array to trace species based on hard X-ray and γ-ray emissions accompanying a differential absorption lidar coupled with a suitable UV/Vis tunable laser. It is mainly useful for rapid identification of the unknown radioactive elements within the plume as well as the corresponding concentration, the exact location and external dose rate. The application of the combined technique enhances the system efficiency.

SUMMARY OF THE INVENTION

The hybrid system includes a transmitter, a receiver, Phoswich scintillators coupled with Photomultiplier tubes (PMTs) array, pulse shape analyzer (PSA), anticoincidence unit, multichannel analyzer (MCA) and the data processor equipped with interactive software for real time control and data acquisition with the access to atomic and nuclear data libraries. Tables (2) and (3) illustrate the nuclear and atomic characteristics of the uranium chain and transuranium elements, respectively, which are used as part of the database. The transmitter employs the pulsed tunable UV/Visible laser and the receiver comprises of a Cassegrain telescope, a Lyot tunable birefringent filter and a sensitive PMT detector. PMT is generally used as a low noise and sensitive detector for UV and visible lidar system. It offers fast response and high gain coupled with good quantum efficiency.

BRIEF DESCRIPTION OF THE DRAWINGS

The foregoing and other objects, features and advantages of the invention will be apparent from the following more particular description of the embodiments of the invention as illustrated in the accompanying drawings wherein:

FIG. 1. Typical α-decay schemes of $${}^{238}_{92}U \text{ and } {}^{228}_{88}Ra.$$

FIG. 2. Decay chain of uranium.

FIG. 3. Performance of Phoswich dual energy analyzer in order to identify X/γ photon energies.

FIG. 4. The Phoswich characteristic parameter $\eta C_{dm}\sqrt{A T_{int}}$ versus plume distace for various X/γ photon energies.

FIG. 5. Phoswich normalized counts, $M/\eta A T_{int}$, versus plume distance for various plume activities and different gamma energies.

FIG. 6 The graphical representation of $$Ln\frac{P_s(\lambda_{off}, R)}{P_s(\lambda_{on}, R)} \text{ and } \frac{d}{dR}\left(Ln\frac{P_s(\lambda_{off}, R)}{P_s(\lambda_{on}, R)}\right)$$

versus range. R0 is the plume location.

Figure 7:
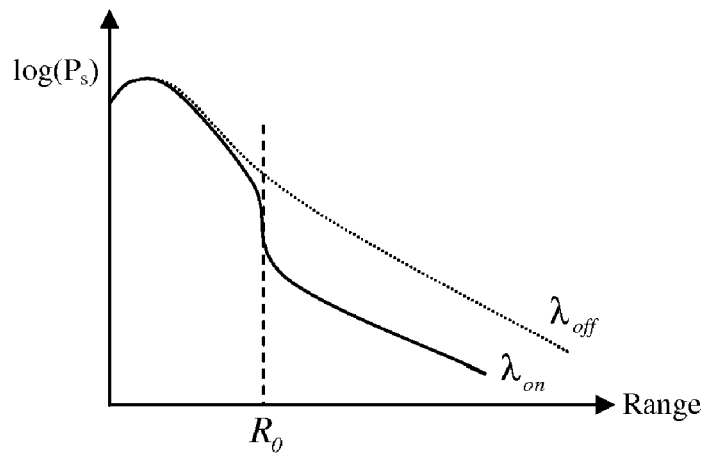
Figure 7:
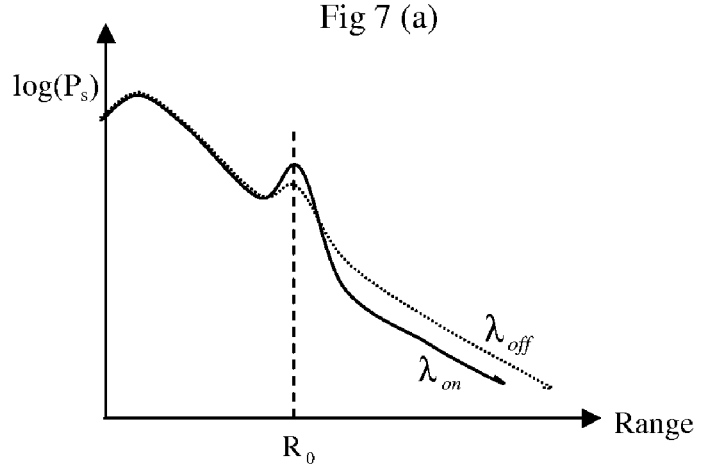

FIG. 7. DIAL response for (a) a gaseous and (b) a cloud or an aerosol plume.

FIG. 8. DIAL maximum range detection versus PMT characteristic parameter, $$P_{s,min}(\lambda_{off}, R)\frac{D^*}{\sqrt{A\Delta f}}\frac{1}{SNR},$$

for various differential absorption coefficients $\Sigma = N[\sigma abs(\lambda_{on}) - \sigma abs(\lambda_{off})]$.

FIG. 9. The Phoswich characteristic parameter in hybrid system, $4\pi M t1/2/AT_{int}$, versus plume concentration at various x/γ energies for different plume locations R.

FIG. 10. The schematic tunable UV oscillator-amplifier of (a) Littman type Ti:Al$_2$O$_3$ laser, (b) Littman type dye laser and (c) a simplified tunable UV BBO-OPO . Gland Prism (GP) and Rochon Prism (RP) are used to separate IR/Vis and UV/Vis spectra based on linear polarization, respectively.

FIG. 11. Simplified geometry of released radioactive materials above the stack of a nuclear power reactor monitoring by DIAL detection.

FIG. 12. The external dose rate equivalent parameter, $v_x \dot{H}/E\gamma Q$, versus distance from reactor stack.

FIG. 13. Schematic diagram of hybrid system for identifying, locating and remote sensing of an unknown radioactive plume in the atmosphere.

FIG. 14. Block diagram of hybrid system performance.

FIG. 15 Schematic diagram of hybrid system for radon monitoring.

Table 1. Annual release of the major radionuclide from a typical reactor or a reprocessing plant.

Table 2. Atomic and nuclear characteristics of some radioactive from uranium chain.

Table 3. Atomic and nuclear characteristics of some transuranium elements.

The foregoing and other objects, features and advantages of the invention will be apparent from the following more particular description of the embodiments of the invention as illustrated in the accompanying drawings.

DESCRIPTION OF THE EMBODIMENTS

Embodiments of the invention will be explained below with reference to the drawings. In all the drawings, similar component parts are designated by similar reference numerals, respectively. The present invention discloses a method and a system for identifying, locating and remote sensing of an unknown radioactive plume containing (i) gamma radionuclides, (ii) alpha emitters in order to calculate external dose rate of plume on earth; real time monitoring of power plant reactor stacks during normal operation or in accidental conditions; and continuously and periodically sensing remotely Radon gas in order to predict earthquake.

In preferred embodiment the present invention discloses a method to calculate external dose rate of plume on earth.

FIG. 14 describes the hybrid system performance in block diagram algorithm, at first DIAL telescope sweeps the atmosphere to receive a backscattered signal of a gaseous or an aerosol plume. The signal is then focused onto a photomultiplier tube through Lyot tunable birefringent filter, adapted to the laser wavelength. The intensity of the backscattered light can be recorded as a function of time, and thus provides the required spatial resolution of the measurement. In the mean while, TOF is measured to determine the plume distance and the velocity of the plume. Then, the field of view of Phoswich detector is automatically aligned along the plume direction, in order to determine whether it is a radioactive plume. The processor unit commands to Phoswich detector array to integrate the signal in a definite time interval along plume direction. The process carries out the second stage of remote sensing by detecting γ- and X-ray photopeaks, using nuclear library, then the radionuclide species and the corresponding half-life can be determined. If there are more than one radionuclide, those can be identified by searching photopeak energies on MCA. In the stage of X/γ detection, the photopeaks of the characteristic hard X-ray of transuranium (40-250 keV) elements can be identified, using Phoswich if available within the radioactive plume. For instance, the typical photopeaks of $^{241}$Am, $^{239}$Pu and $^{235}$U denote to be 59.54 keV, 38.66 keV and 11.5 keV respectively. XeF broadband laser with ~1 nm linewidth covers the uranium absorption line at 351.5 nm for the long range remote sensing while SHG Ti:Saphire laser is an alternative source. Similarly, as listed in Table (3) the photopeak of $^{151}$Sm surge during reactor emergency or shutdown conditions, denote to be 21.54 keV while the corresponding strong absorption line at 429.7 nm lies in the fundamental cumarine laser emission bandwidth. Those x-ray photons are stopped within the thin NaI(Tl) scintillator.

On the other hand, high energetic photons due to the γ emitter radionuclides may generate light in both scintillators accordingly. It allows simultaneous measurement of dE/dx and E for particles that penetrate through thin detector and are stopped in the thick one. For example, the well known γ emitter $^{137}$Cs with photon energy 661.6 keV having 852 nm absorption line can be detected by a tunable fundamental Ti:Saphire laser. If there are simultaneous signals from electronic discriminators, It will identify the γ source species, using the nuclear library data. Similarly, if the disciminator distinguishes a single signal from NaI detector, then the X-ray library is used to determine the transuranium elements. Those photopeaks do not discern the plume location by themselves. It may be an X-ray emitted from a far field dense plume or a near-field dilute one. Therefore it is necessary to quantify the species by a differential absorption lidar. When the radioactive species were identified, the processor searches absorption lines through atomic library data and commands to DIAL to tune laser line at $\lambda_{on}$ and send a pulse to the atmosphere. DIAL tunes the tunable lasers such as Ti:Saphire, dye or OPOs on the typical absorption lines of the identified elements to determine the relative concentration and external dose rate of the species using the logarithmic derivatives of the backscattered signal at $\lambda_{on}$ and $\lambda_{off}$. The backscattered photons are received in a Cosegarian telescope conducted through Lyot to a sensitive PMT. The field of telescope is chosen to be the same as Phoswich array detector having ~90 cm$^2$ area comprising ~80 Phoswich detectors.

The absolute concentration of radioactive is measured from DIAL is calibrated by relative concentration from Phoswich detector. Range, concentration, volumetric activity, χ, and photon energy, $E_\gamma$, are identified subsequently due to hybrid system and the external dose rate $\dot{H}$ can be determined using the given equations, subsequently.

In other embodiment, as shown in FIG. 13, the present invention discloses a system for the above method comprising: A) a Phoswich detector array (PDA) wherein the detector is a combination of two dissimilar scintillators optically coupled to a single PMT, employing pulse shape analyzer (PSA) to suppress background in the counting X-ray. It consists of a typical thin NaI(Tl) and a thick CsI(Tl) within different decay times, 0.25 µs and 1 µs respectively, so that, the shape of the output pulse from the PMT is dependent on the relative contribution of scintillation light from the two scintillators. Lightly penetrating radiations in the order of keV, are stopped fully in the first scintillator, but more penetrating MeV photons may generate light in the thick scintillator. The events generating light in both scintillators are denied to suppress the noise for X-ray counting.

When an X-ray photon from the source enters the detector through a mechanical collimator, it will generally interact with an iodine atom in the NaI crystal. This interaction occurs at a single point in the crystal and causes an electron to be ejected from the atom. This electron then excites the light-generating modes of the crystal to create a scintillation in the form of a pulse of light, whose intensity is proportional to the energy of the original X-ray, to be viewed through a PMT. This tube converts the pulse of light into an amplified electrical charge signal. Thus, the amplifier and the subsequent electronics deal with a peak voltage of the pulse that is proportional to the initial X-ray energy. By calibrating the exact relation between incident X-ray energy loss and the digitized value of the voltage pulse height, the inferred incident energy of the X-ray is revealed. Alternatively, separate electronic pulses are derived from the fast and slow components of the PM tube signals. The energy deposited in scintillator can then be obtained by simultaneous measurements of dE/dx and E for γ photons penetrate the scintillator pair of NaI—CsI pair. Events resulting in scintillations from both volumes can be recognized by their pulse shape and can thus be rejected for X-ray detection, whereas those scintillate simply in CsI are accepted to detect γ photons. FIG. 3 shows the performance of a typical PDA, including about 80 standard Phoswich detectors each one having ~100 cm$^2$ area subtended together to constitute an array of 1 m diameter, PSA unit in order to discriminate X/γ-photopeaks using a MCA. The electronics using PSA is capable of discriminating events in 15-300 keV X-ray and up to several MeV gamma photons. It is characterized by two peaks, one due to NaI(Tl) events and the other due to CsI(Tl) events. The scale in abscissa is correlated with the decay time of the scintillation pulses. The selection of X-ray events is performed through the choice of lower and upper programmable PDA thresholds in the electronic unit.

When the source is small in comparison to the distance at which the dose is to be determined, it is treated as a point source to emit X/γ photons isotropically. Hence, at a distance R from the source, the photons are distributed uniformly over a sphere of area $4\pi R^2$. Those are attenuated by the factor $\exp(-\mu R)$ traveling through the air, where µ is the total attenuation coefficient in air which is dependent on the photon energy. Hence, the X/γ-ray intensity at distance R is given by:

$$I(R) = \frac{C\exp(-\mu R)}{4\pi R^2} \text{ photons/m}^2.\text{s} \qquad (1)$$

where C denotes the activity of the source in Bq. The count M read by Phoswich array is written as:

$$M(R) = \frac{\eta A T_{int} C \exp(-\mu R)}{4\pi R^2} \quad (2)$$

where η, A and $T_{int}$ are detector efficiency, detector area and integration time, respectively. As the radioactive decay is a random process, it is necessary to assume a Poisson distribution, in order to describe radioactive behavior accurately. The standard deviation for Poissonian distribution is $\sigma=\sqrt{M}$, where M denotes the number of counts for a given integration time. The critical level of detection, $L_C$, is defined to be $L_C$=2.33σ, where 2.33 is known as the protection factor. If total counts of detector exceed $L_C$, then it is assumed that some real activity of the source is available. Moreover for total count smaller than $L_C$, it is concluded that the plume does not contain any significant activity.

Phoswich is inherently a low noise limited, typically 100 counts/m².sec. at sea level. Apparently, this figure also takes into account the background radiation coming from the surrounding of the detector. Therefore, any counting rate larger than 100 Hz/m² can be ascribed to be a signal such that $L_c$ becomes to be $23.3\sqrt{AT_{int}}$.

By equating Eq. (2) with $L_C=23.3\sqrt{AT_{int}}$, the minimum detectable activity of Phoswich, $C_{md}$, is determined as below:

$$C_{md} = \frac{93.2\pi R^2 \exp(\mu R)}{\eta\sqrt{AT_{int}}} \quad (3)$$

The characteristic parameter of Phoswich, $\eta C_{md}\sqrt{AT_{int}}$, versus plume distance, R, is depicted in FIG. 4 for several values of X/γ energies. It indicates that $C_{md}$ decreases at higher X/γ energies for a definite plume distance. Similarly, $C_{md}$ increases at longer distances for a definite X/γ energy. Moreover, the value is reduce for closer or larger source at longer integration time or greater area of the array detector. Typically, for the 150 keV X photons, a detector with η=100% and A=1 m² located at 100 m far from the plume during a integration time of 100 sec, using Eq. (3), $C_{md}$ is calculated to be equivalent to 45 µCi.

FIG. 5 plots phoswich counts in terms of the plume distance for a definite activity at various energies based on Eq. (2). In fact, Phoswich is does not function as a perfect remote sensor; because it is unable to discern a far dense plume from a near field dilute one. Moreover, at a definite plume distance Phoswich can not differentiate whether plume contains high activity at smaller γ energy or low activity at higher γ energies. For example, 100 keV with 10⁷ Bq or 10 MeV with 10³ Bq are shown identical counting at 550 m. It arises from the fact that greater atmospheric attenuation takes place at higher gamma energies. Besides, Phoswich is not able to determine external dose.

B) Differential Absorption Lidar (DIAL)

High sensitivity with good spatial resolution for long-range dynamic monitoring of the plume constituents can be achieved by the combination of differential absorption and scattering. DIAL includes high degree of sensitivity per probe energy and the capability of wavelength scanning over a wide variety of molecules and atoms having absorption characteristic in the spectral range as well as the quantitative evaluation of a desired species. A typical DIAL system often sends a pair of pulsed laser wavelengths into the atmosphere. Those lines are close to each other with a large absorption coefficient difference, one at the tunable line, $\lambda_{on}$, where the species under investigation absorb and the other at a nonabsorbing detuned line, $\lambda_{off}$. A couple of such wavelengths, rather than a single one, are needed in order to strongly reduce the effect of the extinction in the atmosphere, mostly due to the scattering, and to correct the instrument calibration constant. When laser wavelength is much greater than the scatter size which is valid for the gaseous plumes, the Rayleigh scattering occurs with the backscattering cross-section proportional to $\lambda^{-4}$. In opposite, for water drops, clusters, dust, volcanic ashes, smokes or the aerosols on condition that the scatter size is being greater than laser wavelength, then Mie scattering becomes dominant. The corresponding cross-section is proportional to $\lambda^{-x}$ where 0.4<x<0.5.

In general, the lidar equation is given by Eq. 4:

$$P_s(\lambda, R) = P_0 \frac{A}{R^2}\xi(\lambda)\beta(\lambda, R)\xi(R)\left(\frac{c\tau_s}{2}\right)\exp\left(-2\int_0^R \alpha(\lambda, R)dR\right) \quad (4)$$

where $P_s(\lambda,R)$ is instantaneous received power from the range R. $P_0$, $\tau_s$, $\beta$(cm⁻¹ Sr⁻¹), $\alpha$(cm⁻¹) and A are the transmitted power, the pulse duration, the volume back scattering coefficient, the extinction coefficient and the telescope area, respectively. $\xi(\lambda)$ and $\xi(R)$ are defined to be the spectral gain coefficient of the receiver and the geometrical factor of the telescope, respectively.

The backscattered light at range R is collected by the optical telescope mounted adjacent to the laser in a time delay (2R/c) and the spatial resolution ascertains $\Delta R=(c\tau_s/2)$, where c is the velocity of light.

The total attenuation factor, α(λ,R), is given as:

$$\alpha(\lambda,R)=\alpha_{atm}(\lambda,R)+N(R)\sigma_{abs}(\lambda) \quad (5)$$

where, $\alpha_{atm}(\lambda,R)$ represents the atmospheric attenuation coefficient, N(R) is the number density of the radionuclide species in the plume and $\sigma_{abs}(\lambda)$ represents the species absorption cross section at λ.

By dividing the received power at $\lambda_{on}$ over that of $\lambda_{off}$ based on Eq. 4, the DIAL equation is written as below:

$$\frac{p_s(\lambda_{on}, R)}{p_s(\lambda_{off}, R)} = \frac{\xi(\lambda_{on})\beta(\lambda_{on}, R)}{\xi(\lambda_{off})\beta(\lambda_{off}, R)} \frac{\exp\left(-2\int_0^R \alpha(\lambda_{on}, R)dR\right)}{\exp\left(-2\int_0^R \alpha(\lambda_{off}, R)dR\right)} \quad (6)$$

when the laser peak powers are chosen to be identical.

The species concentration of the plume, N(R), is derived by rearranging Eq. 6 as below:

$$N(R) = \quad (7)$$

$$\frac{1}{2[\sigma_{abs}(\lambda_{on}) - \sigma_{abs}(\lambda_{off})]}\left[\frac{d}{dR}\left(\text{Ln}\frac{P_s(\lambda_{off}, R)}{P_s(\lambda_{on}, R)}\right) - \frac{d}{dR}\left(\text{Ln}\frac{\beta(\lambda_{off}, R)}{\beta(\lambda_{on}, R)}\right)\right] + [\alpha_{atm}(\lambda_{off}, R) - \alpha_{atm}(\lambda_{on}, R)]$$

In the atomic remote sensing, $\lambda_{on}$ and $\lambda_{off}$ should be close enough to exhibit the same scattering properties, therefore Eq. (7) can be simplified to the Eq. (8):

$$N(R) = \frac{1}{2[\sigma_{abs}(\lambda_{on}) - \sigma_{abs}(\lambda_{off})]} \frac{d}{dR}\left(\operatorname{Ln}\frac{P_s(\lambda_{off}, R)}{P_s(\lambda_{on}, R)}\right) \quad (8)$$

It indicates that N(R) is proportional to the logarithmic derivative of the signal ratio. FIGS. 6.a and 6.b illustrate the expression of $$\operatorname{Ln}\frac{P_s(\lambda_{off}, R)}{P_s(\lambda_{on}, R)} \text{ and } \frac{d}{dR}\left(\operatorname{Ln}\frac{P_s(\lambda_{off}, R)}{P_s(\lambda_{on}, R)}\right)$$

in terms of R to clarify N(R) is strongly correlated to $$\frac{d}{dR}\left(\operatorname{Ln}\frac{P_s(\lambda_{off}, R)}{P_s(\lambda_{on}, R)}\right).$$

The backscattered signal versus R is depicted for a typical gaseous plume and the aerosol (or cloud) in FIGS. 7.a and 7.b, respectively. The large Mie scattering cross-section of aerosols and dust in the path of the laser beam provides a strong signal at both wavelengths, to localize the plume accordingly. In gaseous plume, the backscattering peak due to Rayleigh scattering at $\lambda_{off}$ is negligible. A drastic drop at location of the gaseous plume due to the strong absorption at $\lambda_{on}$ is proportional to the species concentration. The break point predicts the location of the effluent diffusing into the atmosphere. Moreover, scanning to tune laser wavelength at specific absorption line of the radionuclide, the unknown species is determined by exploring the library data. The atomic absorption cross-section is obtained using HITRAN and NIST data base ranging $10^{-16}$-$10^{-19}$ (cm$^{-1}$) within UV/Vis spectrum. Presently, the lack of valid comprehensive data on the atomic cross-sections and the corresponding absorption lines of heavy radionuclides, specially in UV spectral region, causes to limit the application of this technique.

The backscattered signal is measured by the detector whose capability is defined by the minimum detectable laser power. PMT is often used in UV DIAL system. There are two main noise components; (i) dark current due to thermal emission and shot (or statistical) noise and (ii) noises including A/D conversion and that due to the signal amplification. SNR is the significant parameter in the signal-detection discipline to resolve true signal from the background noise. A greater SNR indicates the higher signal over background noise. A SNR of 1.5 is commonly considered as the lower limit for an accurate detector. Signal to noise ratio is given by:

$$SNR = P_s(\lambda_{on}, R)\frac{D^*}{\sqrt{A\Delta f}} \quad (9)$$

where A is the sensitive area of detector, $\Delta f$ is the detector bandwidth, $P_s$ is the signal power incident on the detector and $D^* = D\sqrt{A\Delta f}$ [cm.Hz$^{1/2}$.W$^{-1}$] is normalized detectivity of the detector, where D=1/NEP is detectivity and NEP is noise equivalent power.

The minimum detectable power is given by:

$$P_{s,\min}(\lambda_{on}, R) = SNR\frac{\sqrt{A\Delta f}}{D^*} \quad (10)$$

Inserting Eq. 10 into Eq. (6) and assuming $\lambda_{on}$ is sufficiently close to $\lambda_{off}$, then it is found that:

$$P_{s,\min}(\lambda_{off}, R) = \frac{\sqrt{A\Delta f}}{D^*}\exp\left(2\int_0^R \sum(\lambda, R)dR\right)SNR \quad (11)$$

where $\Sigma(\lambda, R) = N(R)[\sigma_{abs}(\lambda_{on}) - \sigma_{abs}(\lambda_{off})]$ denotes the differential absorption coefficient. The minimum power detectable at $\lambda_{off}$ is obtained by Eq. (11) and inserting into Eq. (4), the laser peak power $P_0$ is determined, subsequently. One of the advantage of this equation is its independence on the dynamic atmospheric volume backscatter coefficient, $\beta$, which is usually a varying parameter due to the unstable meteorological conditions.

FIG. 8 plots the lidar range in terms of the effective detectivity parameter, $$P_{s,\min}(\lambda_{off}, R)\frac{D^*}{\sqrt{A\Delta f}}\frac{1}{SNR},$$

to determine the maximum detectable range as a function of $P_s(\lambda_{off}, R)$ for several plume differential absorption coefficients. It shows that when the sensitivity of PMT increases or the laser power scales up, then it increases nonlinearly. Similarly, it strongly depends on the concentration and the cross-section of the plume components. However, the maximum range is limited due to the asymptotic behavior of the Eq. (11).

Based on the definition of activity, the radionuclide density, N, containing various isotopes of a sole radioactive element is given by:

$$N = \sum_i C^i t_{1/2}^i / \operatorname{Ln}(2) \quad (12)$$

where $C^i$ (Bq/m$^3$) and $t_{1/2}$ are the specific activity and the corresponding half life of the $i^{th}$ species, respectively.

Practically, N is determined by DIAL, using the logarithmic derivative of the backscattered signals at $\lambda_{on}$ and $\lambda_{off}$. Inserting Eq. (2) into (12) and equating it with Eq. (8), the nuclear-DIAL equation is written as follows:

$$\frac{4\pi MR^2 t_{1/2}^i}{AT_{int}}\exp(\mu R) = \frac{\operatorname{Ln}(2)}{2[\sigma_{abs}(\lambda_{on}^i) - \sigma_{abs}(\lambda_{off}^i)]}\frac{d}{dR}\left(\operatorname{Ln}\frac{P_s(\lambda_{off}^i, R)}{P_s(\lambda_{on}^i, R)}\right) \quad (13)$$

FIG. 9 depicts Phoswich characteristic parameter ($4\pi M t_{1/2}/AT_{int}$) in terms of species concentration, N, based on Eq. (13). It demonstrates the characteristic graph for the hybrid system performance. It explains that the function of Phoswich improves efficiently in the hybrid system such that (i) the Phoswich count, M, is linearly proportional to the species concentration, N, and (ii) the Phoswich energy resolution becomes much better at longer ranges.

C) Broadband Tunable UV Lasers

Selective detection of the specific elements in the atmosphere requires to employ tunable lasers in different spectral bands. The tunable broadband higher harmonic generation of Rhodamine and Coumarine dye as well as that of Ti:Al$_2$O$_3$ lasers and the recently-built efficient UV optical parametric oscillators (OPOs) are among the suitable coherent sources for the element tracing. In addition, the excimer and the higher harmonic Nd:YAG lasers are taken into account as the alternatives to monitor some of radionuclides. For long range remote sensing, the multistage amplifiers of dye or Ti:Al$_2$O$_3$ lasers, as well as the optical parametric amplifiers (OPAs) can be exploited in order to scale up the pulse energy of the laser probe.

Broadband dye and Ti:Al$_2$O$_3$ gain media are often desirable to tune a specific wavelength over the bandwidth without changing the cavity mirrors. The dye laser pumped by SHG of Nd:YAG laser offers a wide tunability mainly by changing the dye solutions such as Coumarine and Rhodamine with the spectral emission at 400-500 nm and 570-640 nm, respectively. The higher harmonic of those lasers cover the spectral range of 200-400 nm. The Ti:Al$_2$O$_3$ laser, pumped by a frequency stable SHG Nd:YAG laser at 532 nm, is mostly used as a tunable laser with very broad emission bandwidth 660 to 1180 nm for generation of the short pulses in ns range. The higher harmonic generation of those lasers lie within the attractive UV spectrum of the atomic absorption to be used in the remote sensing.

Various arrangements, such as Hansch array, Double-Quartet prism method and Littman setup are available to perform tuning the emission of tunable lasers. Littman setup is chosen mainly because of easy alignment to achieve single mode with spectral width as narrow as 0.001 Å. For additional linewidth narrowing, intracavity Fabry-Perot etalons or birefringent crystal waveplates can be utilized. The diffraction grating used in Littman arrangement operates as a beam expander and a dispersion element simultaneously, so that the dispersion power becomes two times higher than that of the Littrow mount. FIGS. 10.a and 10.b show Littman-type tunable Ti:Al$_2$O$_3$ and dye lasers using an intracavity grazing incidence grating.

DIAL range in the clean atmosphere, is achievable up to several km using the oscillator-amplifier array. However, the effective range of interactive hybrid system is restricted by the Phoswich performance to a few km and the laser pulse is chosen to be a few tens of mj.

On the other hand, OPOs have several desirable features including a wide range of tunability, a compact size, good beam quality, and the potential of high-gain amplifiers. The practical range of tuning is usually very wide and the gain is relatively flat. The optical parametric amplifier, OPA, is a high-gain device to prompt long range DIAL. Since a high power density is required for the efficient operation, the power density is limited by laser induced damage considerations. The growth of advanced materials with high damage threshold, such as BBO and LBO, has greatly aided the developments of widely tunable and stable UV OPOs as well as advances in UV coating technology so that pulses with several mj energy emerges.

The typical arrangement of a BBO-OPO is shown in FIG. 10.c for short range remote sensing. For this demonstration, a Q-switched THG Nd:YAG laser having 3 cm$^{-1}$ bandwidth, 5 ns duration, 70 mj/pulse at 355 nm, is proposed as an OPO pump for a double type II BBO-OPO resonator to generate typically ~20 mj/pulse, 5 nsec duration, having 4 MW of peak power at 420-709 nm of visible spectrum. The optimum length of BBO crystal is chosen to be ~14 mm to avoid walkoff effect, therefore a double BBO is implemented to increase the efficiency. Tuning of the OPO can be accomplished by the rotation of both crystals simultaneously with the identical angular frequency. The extracavity double type-I BBO is employed as an efficient second harmonic generator to deliver 5 mj/pulse, 5 ns duration, such that, the tuning of the type II BBO-OPO extends the spectral range from 210 to 345 nm to represent a promising source of UV DIAL.

Tables (2) and (3) summarize several uranium chain and transuranium elements with the corresponding strong absorption lines and the most suitable lasers for DIAL application. For instance, the corresponding UV absorption lines ($\lambda_{on}$) of $^{238}$U are 351.5, 356.7, 358.5 nm, which lie on the SHG spectrum of Ti:Al$_2$O$_3$ laser. Similarly, the remote sensing of $^{232}$Th is performed at 324.6 nm using THG of that laser. $^{234}$Pa and $^{233}$Tl from uranium chain may be traced at the corresponding absorptive lines of 363.4 and 377.5 nm, respectively. XeF laser at 351 nm is also the other choice for uranium remote sensing. In addition, UF$_6$ leakage to the atmosphere at temperature above 30° C. undergoes the gas phase condition. Subsequently, the UF6 effluents from the stack of the uranium conversion plants can be sensed by the hybrid system using SHG Rd6G or SHG Ti:Al$_2$O$_3$ lasers as well as UV-OPO of BBO at 320.4 nm.

It is understood that, the narrow line width of the absorption spectra of atoms and molecules often lie within 0.01-0.1 cm$^{-1}$. Moreover, the spectral emission of most lasers characterizes normally a bandwidth of 0.1-1 cm$^{-1}$. Even though several isotopes of a radionuclide possess the isotope shifts ~few to tenth of cm$^{-1}$, however the selective detection of a specified isotope is achieved using the dispersive optics associated with single mode arrangement of the resonator to reach laser bandwidth as short as 0.01 cm$^{-1}$ accompaning by the temperature and frequency stabilization. Alternatively, in order to avoid the implementation of DIAL with such a high spectral resolution, Phoswich is employed to identify the relative X/γ emissions of the different isotopes. It is taken into account as a figure of merit for the hybrid system to prevent using sophisticated laser systems. If the aim is not the isotopic identification of radionuclide, then a broad band laser can be employed effectively where the laser bandwidth is chosen to be in order of the absorptive line difference of the radioanuclide.

D) Software Database and Processor Unit

The system further comprises a software database, wherein said software database performes based on tables 1-3. Said software processes nuclear data coming from phoswich array detector which contains photopeaks energy information in order to determine the type of radionucleides in the plume. In addition, said software determines the corresponding atomic absorption lines of respective radio active elements.

Next, said software sends a message to laser tuning device to tune the laser at $\lambda_{on}$. Following above steps, the software commans to the laser to send a pulse toward the target plume, said laser sends a pulse toward the plume, DIAL receives the backscattered signal coming from the plume. As a result of relating said photopeaks informations and said backscattered signals, corresponding concentration of radioactive elements as well as corresponding external dose rate which is explained below in details.

Yet in another embodiment, the present invention discloses a unique application of hybrid system to determine external dose rate.

Radiation dose received from the airborne radioactive material that might escape from the reactor containment is assumed to be similar to that from a smokestack but closer to the ground. The plume moves in x-direction by the wind while it diffuses in two perpendicular directions, i.e. laterally (or cross wind) and vertically as shown in FIG. 11. Observation made on small plume indicates that the diffusion acts as a Gaussian distribution of the plume about a centerline. According to the Gaussian plume model, presuming that the containment constitute a continuous point source, then the radioactivity distribution of a specific radionuclide on the ground, , would be represented by:

$$\chi(x, y, h) = \frac{Q}{\pi v_x \sigma_y \sigma_z} \exp\left(-\frac{1}{2}\left(\frac{h^2}{\sigma_z^2} + \frac{y^2}{\sigma_y^2}\right)\right) \quad (14)$$

where volume activity, $\chi$, (Ci/m$^3$) is the concentration of radioactivity at a point (x, y) on the ground; Q (Ci/s) is the rate of released activity at top of the stack which is determined by the hybrid system. Moreover, $v_x$ (m/s) denotes the wind speed in the x direction, h (m) is the effective height of the radioactivity release (here, height of reactor stack), and y (m) ascertains the lateral distance of the detector from the plume centerline; $\sigma_y$ and $\sigma_z$ are defined to be the standard deviations of the plume distribution in y (lateral) and z (vertical) directions, respectively. Those depend on both atmospheric stability and the distance from the source. Experimental data shows that $\sigma_y$ and $\sigma_z$ increase as $x^{1/0.894}$ from the point of emission. Pasquill obtained a set of curves for $\sigma_y$ and $\sigma_z$ at six different atmospheric stability conditions, such that less stable conditions have the higher values of both $\sigma_y$ and $\sigma_z$ than stable one.

The value of $\chi$ is largest along the center-line of the plume, where y=0. The concentration is rewritten as below:

$$\chi(x, h) = \frac{Q}{\pi v_x \sigma_y \sigma_z} \exp\left(-\frac{h^2}{2\sigma_z^2}\right) \quad (15)$$

It is noticeable to emphasize that $v_x$ and h of the plume are determined by DIAL response based on the geometry of detection and the time of flight (TOF) measurements.

The external equivalent dose rate $\dot{H}$ (rem/s) from an infinite uniform plume located above ground level, containing a single radionuclide at a concentration of $\chi$ (Ci/m$^3$), with the quality factor equivalent to unity for a single gamma energy, $E_\gamma$ (MeV), is written approximately as below:

$$\dot{H} = 0.262 \overline{E}_{\gamma,x} \cdot \chi \quad (16)$$

Substitution $\chi$ from Eq. (15) into Eq. (16) we find:

$$\dot{H} = \frac{0.262 \overline{E}_{\gamma,x} Q}{\pi v_x \sigma_y \sigma_z} \exp\left(-\frac{h^2}{2\sigma_z^2}\right) \quad (17)$$

Thus, equivalent dose rate is calculated by data acquisition from the Phoswich to identify corresponding γ energies of the photopeaks as well as the determination of the plume range and the species concentration from the DIAL response. For several types of radionuclides within the plume, Eq. (17) should be a summation over all γ energies, such that, $\overline{E}_\gamma$ attributes to the average energy of the all gamma rays.

FIG. 12 is the graphical representation of Eq. (17). It shows the quantity $v_x \dot{H}/E_\gamma Q$ for the effluent released above the reactor stack versus distance x far from it. It represents that maximum $\dot{H}$ occurs at a certain distance $x=(h/\sqrt{2})^{0.894}$. It arises from the fact that the plume diffuses vertically downward to reach the ground level.

Furthermore, in order to estimate the external dose rate, at first, volumetric activity, $\chi$, is determined from Eq. (15) while, the rate of release of activity above the stack, Q, is obtained from Eq. 13 and FIG. 9.

Tables (1)-(3) gives values of $E_\gamma$ for the most important gaseous fission products eminated from the reactor vessel. These are the gases that are released to the environment in small quantities during the normal operation of a reactor to become a significant amount during an accident.

In another embodiment, the present invention discloses real time monitoring of power plant reactor stacks during normal operation or in accidental conditions.

The nuclear power plants usually release various gaseous and liquid effluents as well as highly radioactive mixture of fission products components in structural and cladding materials due to neutron activation as well as small amounts of long lived transuranium elements (Z>92) during their normal operation. The radionuclides discharge to atmosphere is evaluated to be ~1 TBq/GW. However, all nuclear reactor systems are designed with a number of barriers that limit the escape of those radionuclides during normal operation and in the event of an abnormal occurrence. Table (1) summarizes the annual releases of the major radionuclides from typical reactors and reprocessing plants to the environment which majority of those nuclides are X/γ emitters including the corresponding nuclear and atomic characteristics. In both pressurized-water reactors (PWR) and boiling-water reactors (BWR), the condenser steam-jet air ejectors and the turbine gland-seal system are two important sources that release gaseous radioactive products to the atmosphere through the stack. The individual dose is determined to be 0.2 μSv/yr, which is less than 0.1% of the background level radiation. They may emanate considerably more radioactivity higher than background level during the course of an accident, where especially radioactive gases are first released into the containment building and may leak to the atmosphere subsequently.

One should calculate the doses to public from such releases in order to evaluate the environmental impact of the operating plant to assure that this is within the acceptable standards. During emergency conditions of an operating reactor, the leakage of Samarium is drastically increases due to LOCA. The strong Samarium absorption line at 429 nm can be matched well with the fundamental harmonic of coumarine laser as well.

The present invention is exploited for the real time radioactive plume monitoring, in accident or emergency conditions as well as the normal operation of nuclear power plant. In general, the laser interaction with the released materials above the stack is known to be Rayleigh scattering at the reactor normal operation. However, the concentration of the effluents increases to become noticeable above the background level when an accident occurs, such as LOCA (Loss of Coolant Accident) similar to that of Three Mile Island power plant, leading to the core meltdown. Power excursion is categorized as the other major accident in the reactor, particularly Chernobyl accident, when steam explosion of the pressure vessel leads to the release of heavy plume including various nuclides with a dense cloud to such an extent that Mie scattering becomes dominant.

Hybrid system can be used for continuous, atmospheric mapping and systematic monitoring of radioactive plume constituents based on the optical remote sensing DIAL and Phoswich detector arrangements. In a reactor accident, the radionuclides such as fission products, are first released into the containment building and subsequently may leak to the atmosphere. The activity of the resulting effluent depends on the rate at which this leakage occurs. Beside the released gaseous products such as I, Xe, Kr and Sm which easily escape the nuclear power plant containment, the other radionuclides, such as and Pu can also be released, because of the fuel evaporation due to high temperature. In general, the laser plume interaction due to the released radioactive materials above the stack could be Rayleigh scattering at the reactor normal operation. However, the relative concentration of the effluents increases to become noticeable above background level when an accident such as LOCA occurs. Power excursion is categorized as another major accident in the reactors, when steam explosion of the pressure vessel leads to the release of heavy plume including various nuclides with a dense cloud to such an extent that Mie scattering becomes dominant. The tuned laser probe can be used for the prompt identification and quantification of the accidental radioactive leakage to the atmosphere as well as normally radionuclide release in ppm around the stacks of nuclear power plant or radioisotope labs, reprocessing plant and conversion facilities.

The interactive performance of the hybrid system is shown in FIG. 14. The arrangement includes two main sections of Phoswich detector and DIAL which interact with each other through a processor unit to show the simultaneous operation of the individual units. According to FIG. 15 which describes the hybrid system performance in block diagram algorithm, at first DIAL telescope sweeps the atmosphere to receive a backscattered signal of a gaseous or an aerosol plume. The signal is then focused onto a photomultiplier tube through Lyot tunable birefringent filter, adapted to the laser wavelength. The intensity of the backscattered light can be recorded as a function of time, and thus provides the required spatial resolution of the measurement. In the mean while, TOF is measured to determine the plume distance and the velocity of the plume. Then, the field of view of Phoswich detector is automatically aligned along the plume direction, in order to determine whether it is a radioactive plume. The processor unit commands to Phoswich detector array to integrate the signal in the definite time interval along plume direction. The process carries out the second stage of remote sensing by detecting γ- and X-ray photopeaks, using nuclear library, then the radionuclide species and their half-life can be determined. If there is more than one radionuclide, those can be identified by searching photopeak energies on MCA. In the stage of X/γ detection, the photopeaks of the characteristic hard X-ray of transuranium (40-250 keV) elements can be identified, using Phoswich if available within the radioactive plume. For instance, the typical photopeaks of $^{241}$Am, $^{239}$Pu and $^{235}$U denote to be 59.54 keV, 38.66 keV and 11.5 keV respectively. XeF broadband laser with ~1 nm linewidth covers the uranium absorption line at 351.5 nm for the long range remote sensing while SHG Ti:Saphire laser is an alternative source. Similarly, as listed in Table (3) the photopeak of $^{151}$Sm surge during reactor emergency or shutdown conditions, denote to be 21.54 keV while the corresponding strong absorption line at 429.7 nm lies in the fundamental cumarine laser emission bandwidth. Those x-ray photons are stopped within the thin NaI(Tl) scintillator.

On the other hand, high energetic photons due to the γ emitter radionuclides may generate light in both scintillators accordingly. It allows simultaneous measurement of dE/dx and E for particles that penetrate through thin detector and are stopped in the other one. For example, the well known γ emitter $^{137}$Cs with photon energy 661.6 keV having 852 nm absorption line can be detected by a tunable fundamental Ti:Saphire laser. If there are simultaneous signals from electronic discriminators, it will identify the γ source species, using the nuclear library data. Similarly, if the discriminator distinguishes a single signal from NaI detector, then the X-ray library is used to determine the transuranium elements. Those photopeaks do not discern the plume location by themselves. It may be an X-ray emitted from a far field dense plume or a near-field dilute one. Therefore it is necessary to quantify the species by a differential absorption lidar. When the radioactive species were identified, the processor searches absorption lines through atomic library data and commands to DIAL to tune laser line at $\lambda_{on}$ and send a pulse to the atmosphere. DIAL tunes the tunable lasers such as Ti:Saphire, dye or OPOs on the typical absorption lines of the identified elements to determine the relative concentration and external dose rate of the species using the logarithmic derivatives of the backscattered signal at $\lambda_{on}$ and $\lambda_{off}$. The backscattered photons are received in a Cosegarian telescope conducted through Lyot to a sensitive PMT. The field of telescope is chosen to be the same as Phoswich array detector encircle ~80 Phoswich having ~90 cm$^2$ area.

The absolute concentration of radioactive is measured from DIAL is calibrated by relative concentration from Phoswich detector. Range, concentration, volumetric activity, $\chi$, and photon energy, $E_\gamma$, are identified subsequently due to hybrid system and the external dose rate $\dot{H}$ can be determined based on Eq. 17, subsequently. Several universal graphs are obtained to predict the functions of the hybrid system.

The relative activity and the type of radionuclide are identified by Phoswich and similarly $t_{1/2}$ can be extracted from nuclear library data, while $\lambda_{on}$ is determined via atomic library, to tune at strongest absorption transition, in order to evaluate the absolute concentration of the radionuclide.

Yet in another embodiment, the present invention discloses continuously and periodically, remotely sensing Radon gas in order to predict earthquake.

Radon, the 86th element of the periodic system, is produced by the alpha decay of 226Ra in the decay series of 238U, as shown in FIGS. 1 and 2. It is the heaviest noble gas and highly radioactive. Its natural abundance is so low that could not be identified when the researchers discovered other inert elements. Only applications of the radiometric method using alpha detectors, made the radon discovery possible. Radon is a colorless, odorless gas, which is available naturally in the underground reservoirs. It can be diffused through the soil and the rocks into the atmosphere. Radon is known to be an emitter, which its normal concentration in the atmosphere is measured to be in ppm level.

The abrupt changes in the subsequent profiles of radon abundance in the atmosphere is taken into account as a significant parameter for the onset of earthquake. There is proportionality between a surge in emission of radon gas within a particular area and high probability of earthquake occurring in that area. In fact, the monitoring has revealed that tectonic movement that produces earthquake, very often induces significant radon emission a few days before the quake. The hybrid system of detection employs the characteristic γ-ray emission as a nuclear foot print of radon as well as its unique UV absorption line as its atomic foot-print as well as the corresponding fluorescence emission lines. The alpha emission of radon is associated with its 510 keV gamma emission, which could be detected by the Phoswich, Atomic absorption line of radon in UV spectral range, enable us to tune a suitable UV laser probe to determine local concentration of Radon. Our invention discloses a radon monitoring technique based on tunable UV laser based DIAL coupled with the Phoswich array, for instantaneous mapping of background radon emission. Detection of abrupt changes contributes significantly to predict forthcoming seismic events.

As shown in FIG. 15, at first, DIAL telescope, mounted on a vehicle, sweeps the direction of motion to receive the backscattered signals of the radon effluent. According to TOF, the location and the concentration of radon will be identified. The processor commands to Phoswich detector to integrate the signals in the definite time interval, as to the vehicle stops at location during the collection time. The field of view of Phoswich detector is automatically aligned to the effluent direction in order to determine the photopeaks of γ photons of radon at 510 keV. This X-ray photon is stopped within the thin NaI(Tl) scintillator, while high energetic γD-rays due to the γ-emitter radionuclides may generate light in the thick scintillator accordingly. It will identify the radon photopeak and the relative concentration using the nuclear library data. Therefore, during the Phoswich integration time, the characteristic X-ray or γ emission of the other radionuclides may be identified, to search the corresponding absorption lines through the atomic library. Then, the processor commands to DIAL to tune the appropriate UV line of laser probe particularly for radon monitoring.

The received area of detector with an array PMT of the coupled Phoswich detectors is designed to be equivalent to the telescope area of the lidar system with the same solid angle such that the lidar telescope and the Phoswich detector own the same photon acceptance.

The radon monitoring could be static or mobile. In static monitoring, laser probe is more powerful, while foe the mobile scanning the system is mounted on vehicle (van or helicopter). Table 4 illustrates some properties of the typical UV laser i.e. a second harmonic generation of the Ti:Al2O3 laser pumped by SHG Nd:YAG. A UV differential absorption lidar system for the measurement of radon is proposed to fulfil all requirements for the operation on broad of a small helicopter.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

TABLE 1

Atomic and nuclear characteristics of the major radionuclide released from a typical reactor or a reprocessing plant.

| Nuclide | Half-life | X or γ-ray energies (keV) | Strong absorption lines (nm) | Applicable tunable laser |
|---|---|---|---|---|
| $^{85}$Kr | 10.76 y | 151.2, 362.8, | 886.300 | Ti:Al$_2$O$_3$ fundamental |
| $^{86}$Rb | 18.631 d | 514.0 | 780.027, 794.760 | Ti:Al$_2$O$_3$ fundamental |
| $^{89}$Sr | 50.53 d | 1077.0 | 460.733 | Ti:Al$_2$O$_3$ SHG, Coumarine |
| $^{91}$Y | 0.18 y | 909. 0 | 410.2364, 407.7359, | Ti:Al$_2$O$_3$ SHG, Coumarine, OPO |
| $^{95}$Zr | 64.02 d | 1204.8 | 412.8299 | Ti:Al$_2$O$_3$ SHG, OPO |
| $^{102}$Rh | 207 d | 235.7, 724.2 | 351.9604, 360.1191 | Ti:Al$_2$O$_3$ SHG, Rd6G SHG, OPO |
| $^{111}$Ag | 7.45 d | 556.6 | 343.489, 352.802, | Ti:Al$_2$O$_3$ SHG, Rd6G SHG, OPO |
| $^{115}$Cd | 44.6 d | 96.8, 245.4, | 369.236 | Coumarine SHG, Rd6G SHG, |
| $^{125}$Sn | 8.04 d | 342.1 | 328.0680, 243.7783, | OPO |
| $^{127}$Sb | 3.85 d | 105.2, 158.0, | 338.2887 | Ti:Al$_2$O$_3$ SHG, OPO |
| $^{131}$I | 8.020 d | 336.2 | 228.8022, 361.0508, | Coumarine SHG, OPO |
| $^{133}$Xe | 5.243 d | 270.6, 332.1 | 441.563 | Coumarine THG |
| $^{137}$Cs | 30.04 y | 61.1, 252.4, | 283.9976, 286.3315, | |
| $^{140}$Ba | 12.752 d | 290.8 | 303.4115 | Ti:Al$_2$O$_3$ fundamental |
| $^{144}$Ce | 284.9 d | 80.2, 177.2, | 217.5818, 231.1463, | Ti:Al$_2$O$_3$ SHG, Rd6G fundamental |
| $^{147}$Nd | 10.98 d | 284.3 | 252.8509 | Ti:Al$_2$O$_3$ SHG, Coumarine |
| $^{151}$Sm | 90 y | 81.0, 160.6 | VUV | Rd6G SHG, OPO |
| $^{155}$Eu | 4.7611 y | 283.5, 661.7 | | Coumarine fundamental Ti:Al$_2$O$_3$ SHG |
| | | 30.0, 162.7, | 852.1 | Ti:Al$_2$O$_3$ SHG, Coumarine fundamental, |
| | | 304.9 | 553.5481 | |
| | | 41.0, 80.1, | 460.379 | |
| | | 133.5 | 348.488, 463.424 | |
| | | 91.1, 120.5, | 374.5605, 429.6012 | |
| | | 275.3 | 459.4033, 462.722, | |
| | | 21.5 | 466.188 | |
| | | 45.3, 60.0, | | |
| | | 86.5 | | |

TABLE 2

Atomic and nuclear characteristics of some uranium.

| Nuclide | Principle decay mode | Half-life | X- or γ-ray energies (keV) | Strong absorption lines (nm) | Applicable tunable laser |
|---|---|---|---|---|---|
| $^{238}$U | alpha | 4.56 × 10$^9$ y | 49.6, 113.5 | 351.4610, 356.6590, | XeF, Ti:Al$_2$O$_3$ SHG, |
| $^{234}$Pa | beta | y | 131.3, 99.9 | 358.4877 | OPO |
| $^{230}$Th | alpha | 6.75 h | 68.0 | 363.652, 375.267, | Ti:Al$_2$O$_3$ SHG, |

TABLE 2-continued

Atomic and nuclear characteristics of some uranium.

| Nuclide | Principle decay mode | Half-life | X- or γ-ray energies (keV) | Strong absorption lines (nm) | Applicable tunable laser |
|---|---|---|---|---|---|
| $^{226}$Ra | alpha | $8.0 \times 10^4$ y | 186.2 | 398.223 | OPO |
| $^{222}$Rn | alpha | $1.62 \times 10^3$ y | 510.0 | 371.9434, 380.3075, 382.8384 | Ti:Al$_2$O$_3$ SHG, OPO |
| $^{210}$Po | alpha | 3.82 d | 803.1 | 482.591, 566.081 | Ti:Al$_2$O$_3$ SHG |
| $^{206}$Pb | Stable | 138.4 d | — | 745.000, 705.542 | Ti:Al$_2$O$_3$ fundamental |
|  |  |  |  | 255.801, 300.321, 245.008 | Ti:Al$_2$O$_3$ SHG, OPO |
|  |  |  |  | 283.3053, 405.7807 | Ti:Al$_2$O$_3$ SHG, OPO |

TABLE 3

Atomic and nuclear characteristics of some transuranium elements.

| Nuclide | Principle decay mode | Half-life (year) | X- or γ-ray energies (keV) | Strong absorption lines (nm) | Applicable tunable laser |
|---|---|---|---|---|---|
| $^{237}$Np | alpha | $2.144 \times 10^6$ | 29.4, 86.5, 57.1 | 697.209 | Ti:Al$_2$O$_3$ fundamental |
| $^{239}$Pu | alpha | $2.411 \times 10^4$ | 38.7, 51.6, 68.7 | 372.0243, | Ti:Al$_2$O$_3$ SHG, OPO |
| $^{241}$Am | alpha | 432.2 | 59.5, 99.0, 102.4 | 420.6481 | Rd6G fundamental |
| $^{244}$Cm | alpha | 18.1 | 98.9 | 605.464 299.9385, 310.9690 | Ti:Al$_2$O$_3$ SHG, Rd6G SHG, OPO |

What is claimed:

1. A method for predicting timing of an earthquake from atmospheric radon detection comprising:
   calculating external dose rate of an unknown radioactive plume wherein said plume comprises of at least one radionuclide on earth, the method further comprises the steps of;
   Sweeping atmosphere to receive a backscatter signal by a DIAL telescope;
   Identifying a gaseous or an aerosol plume;
   Identifying distance and velocity of said plume;
   Integrating gamma and/or x-ray photons of said plume in a predetermined time interval and in a predetermined direction;
   Searching for at least one photopeaks generated by scintillation detectors;
   Identifying type of said radionuclide;
   Determining half-life of said radionuclide using nuclear library;
   Searching absorption lines of said identified radionuclide through atomic library;
   Tuning laser line of said DIAL with said absorption lines of said identified radionuclide;
   Transmitting sequentially said absorptive laser pulse and said nonabsorptive laser pulse with 1 μsec time delay to said plume;
   Analyzing said backscattered signal, thereby determining absolute concentration of said radionuclide within said plume; and thereby calculating external dose rate of said plume on earth and predicting timing of an earthquake.

2. A method as claimed in claim 1, wherein said gaseous or an aerosol plume comprises Radon gas.

3. A method as claimed in claim 1, wherein said method identifies prompt ppm of an accidental radioactive leakage.

4. A method as claimed in claim 1, wherein said method identifies prompt ppm of normal radioactive leakage.

* * * * *